//
United States
Wachsman

[11] 3,970,369
[45] July 20, 1976

[54] CORRECTIVE MAKEUP AND EMPLOYING PRESCRIPTION LENSES

[76] Inventor: Phyllis Wachsman, 400 Rugby Road, Brooklyn, N.Y. 11226

[22] Filed: Feb. 26, 1975

[21] Appl. No.: 553,256

[52] U.S. Cl. .................................. 350/202; 350/70
[51] Int. Cl.² .................... G02B 17/00; G02B 7/02
[58] Field of Search ........... 350/202, 300, 308, 309, 350/70; 351/59, 155, 158; 240/4.1, 4.2

[56] References Cited
UNITED STATES PATENTS

| 71,320 | 11/1867 | Neagles | 350/305 |
| 2,559,290 | 7/1951 | Engelmann | 350/300 |
| 3,374,047 | 3/1968 | Gutchell | 350/70 X |
| 3,495,898 | 2/1970 | Del Vecchio | 351/59 X |
| 3,677,620 | 7/1972 | Bettencourt | 350/202 X |

FOREIGN PATENTS OR APPLICATIONS

| 1,295,776 | 5/1969 | Germany | 350/202 |

*Primary Examiner*—Paul A. Sacher
*Attorney, Agent, or Firm*—Arthur L. Plevy

[57] ABSTRACT

There is disclosed a combination mirror having affixed thereto in an adjustable relationship, one or more prescription lenses. The lenses as mounted on the mirror structure, enable a user with a visual handicap to apply cosmetics and perform other tasks as the tweezing of eyebrows and so on, with a great deal of ease and convenience.

9 Claims, 3 Drawing Figures

CORRECTIVE MAKEUP AND EMPLOYING PRESCRIPTION LENSES

BACKGROUND OF INVENTION

This invention relates to a mirror in general and more particularly to a mirror employing a pair of corrective lenses to enable a handicapped user to effectively apply makeup to the eyes or other areas.

It is quite evident that a great number of women and others have difficulties with their vision and wear or use corrective lenses in order to function properly.

In any event, it is also known that eye makeups and other preparations for enhancing the beauty of the eyes are available and are desireable for cosmetic purposes.

It is therefore apparent that a woman who has impaired vision would have extreme difficulty in applying such makeup, without the use of her corrective lenses, such as eyeglasses and so on. It is also apparent that the glasses will interfere with the application of cosmetics and with other types of beauty techniques, such as the tweezing of eyebrows or the curling of eyelashes and so on.

While the problem of application of cosmetics and such beauty functions are of primary concern to women, one can also visualize that the general problem may be experienced by men as well in shaving and other techniques.

The prior art has been cognizant of such problems in general, as evidenced by U.S. Pat. No. 3,677,620 entitled CORRECTIVE MIRROR ASSEMBLY issued on July 18, 1972 to J. Bettencourt. In any event, the solution proposed therein is extremely difficult to implement and would be a relatively expensive structure.

Another structure which is of general interest, is shown in U.S Pat. no. 3,374,047 issued to A. D. Gatchel and entitled MAKEUP AID WHICH INCLUDES A MAGNIFYING LENS IN FRONT OF A MIRROR, issued on Mar. 19, 1968. The structure proposed therein is also relatively complicated, difficult to fabricate and not entirely suitable for the problems as indicated above.

It is therefore an object of the present invention to provide an improved makeup mirror assembly for assisting persons with visual handicaps in performing tasks which are conventionally performed before a mirror.

DESCRIPTION OF PREFERRED EMBODIMENT

A makeup mirror assembly for use by an individual having a visual handicap, which handicap can be corrected by means of corrective lenses or the like which comprises a mirror having a reflecting surface and at least one lens secured to a side surface of said mirror, said lens selected in accordance with the requirements of said handicapped user and said lens as secured, capable of being pivotally adjusted and mounted at a distance in front of said mirror to enable said handicapped user to view in image reflected from said surface with minimum distortion.

DETAILED DESCRIPTION OF DRAWINGS

Figure 1:
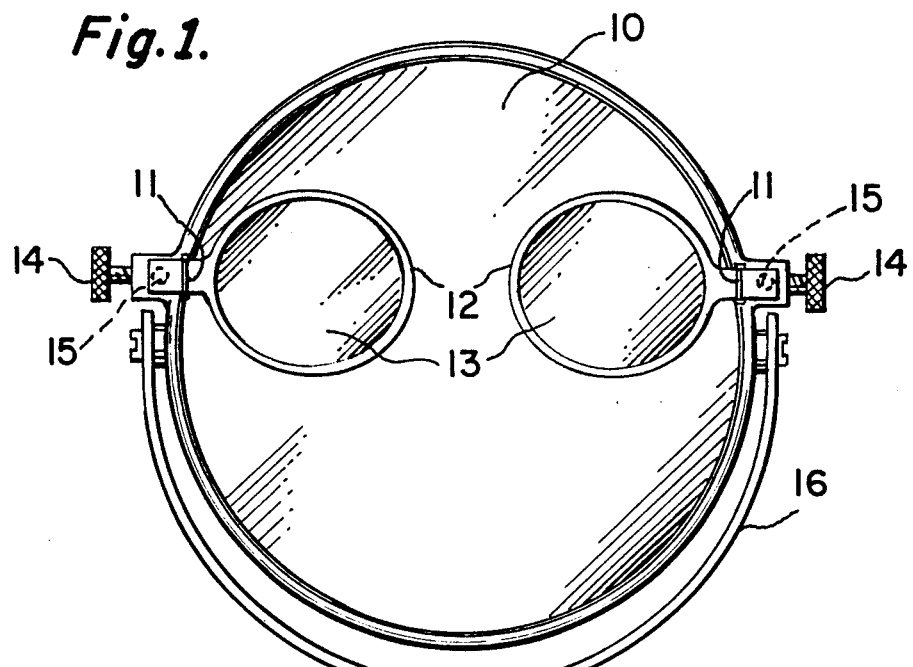
FIG. 1 is a front perspective view of a makeup mirror assembly according to this invention.

Referring to FIG. 1, there is shown a rather conventional mirror assembly 10. Such mirrors as 10 are available and are sometimes referred to as shaving or cosmetic mirrors and may have one side arranged in a magnifying mirror construction and an opposite side having a conventional non-magnifying mirror construction.

While the shape of the mirror 10 is shown as circular, it is, of course, apparent that any other shape would suffice. Therefore, rectangular or other configuration mirrors could be employed as well.

The mirror 10 is conventionally surrounded or retained within a frame and the frame may be pivotally or rotatably secured to a bracket 16, which is affixed to a base 26.

Therefore, as can be seen, one could rotate the mirror or position the mirror 10 with respect to the base 26.

The base 26 would normally be positioned on horizontal surface, such as a night table or makeup table and so on.

Shown positioned in front of the mirror are two lens assemblies, both designated as 12. The assemblies 12 comprise a frame which is a conventional eyeglass frame having mounted therein, a corrective lens as 13.

Each lens, of course, is ground or fabricated according to the prescription of an intended user.

In any event, a person so handicapped may actually employ a regular pair of glasses and separate the same, as shown, into two individual assemblies.

Thus, the structure shows one lens arrangement 12 for the right eye and one lens arrangement 12 for the left eye.

Each of the frame members for the lenses 13 include a hinged assembly 11, as would be found on a conventional pair of spectacles and which in a conventional pair of spectacles, serve to couple the temples to the lens frame assembly.

Figures 2, 3:
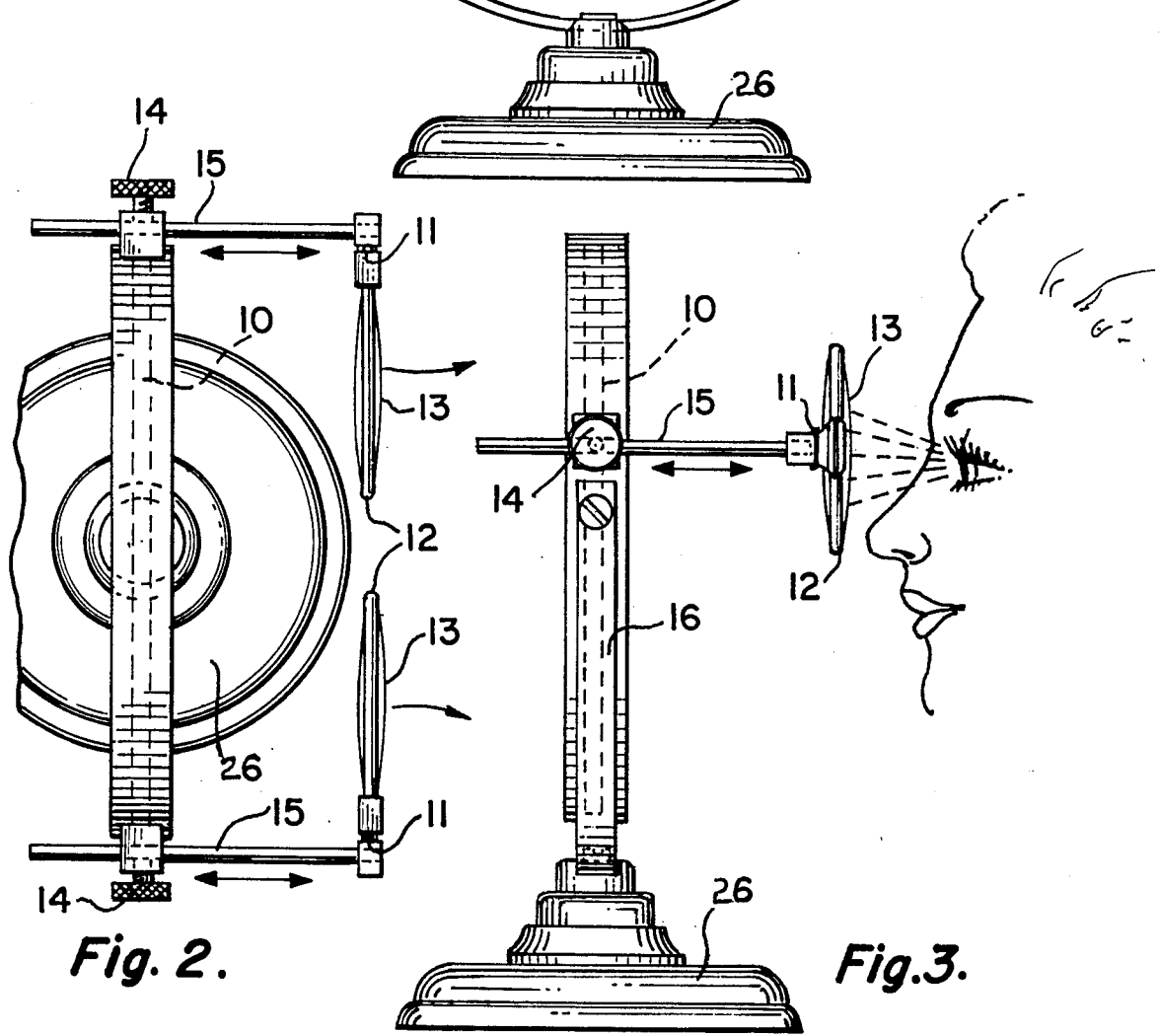
FIG. 2 is a top elevational view of the assembly shown in FIG. 1.
FIG. 3 is a side elevational view of the apparatus according to this invention depicting a user of such an apparatus.

A pair of rods shown in FIG. 2 as 15, which are analguous to the temple assemblies are retained within two brackets located on the side of the mirror frame. The rods can be moved within the apertures in the brackets, and as shown in FIG. 2 by the arrows associated with the rods 15, move inwardly or outwardly by means of conventional adjusting screws as 14 to therefore position the entire assembly from the reflecting surface of the mirror 10 according to the needs or desires of the handicapped user.

Also shown in FIG. 2 are two arrows associated with the lenses 13, which indicate that the lenses can be pivoted or moved about the hinge 11, approximately 180 degrees clockwise or counterclockwise. This feature, therefore, enables a user to operate with only one lens at a time, if so desired, or both. It further enables the mirror to be used conventionally by rotating both lens assemblies in line with the supporting rods 15.

Referring to FIG. 3, a side view is shown of the apparatus to enable one to visualize how the assembly would be employed and further showing the capability of adjustment and rod positioning, permitting the entire lens assembly to be moved in the direction of the arrow, according to the needs and desires of the user.

While the invention has been described in a form of a preferred embodiment, it is readily apparent that the exact structure depicted may be modified or varied in a number of details without departing from the spirit and scope of the invention.

For example, the lens assembly may be retained by other means than the brackets shown and positioned in front of the reflecting surface 10 using other mechanical brackets. Other modifications as to the lenses, frames and so on can be implemented as well.

Therefore, it is apparent that the invention is subject to alteration and modification without departing from the underlying principles involved and hence, any limitations are to be construed only by the terms of the claims appended hereto.

I claim:

1. A makeup mirror assembly adapted for use by an individual having a visual handicap, which handicap can be corrected by means of corrective lenses or the like, comprising:
    a. a mirror having a reflecting surface,
    b. a first and second corrective lens assembly positioned in front of said reflecting surface, one at a right side and one at a left side, each of said first and second lens being pivotally mounted at a distance in front of said mirror to enable a user to view an image reflected from said surface with minimum distortion, and
    c. adjustable means for coupling said first and second lens assembly to such mirror for adjusting said distance in front of said mirror at a predetermined distance selected in accordance with the vision of said user.

2. The makeup mirror assembly according to claim 1 further comprising:
    a. a frame assembly adapted to retain said mirror about the peripheral edges thereof, and a stand secured to said frame for positioning said mirror on a horizontal surface.

3. The assembly according to claim 2 wherein said adjustable means further includes a separate rod for each of said lens, and adjustable means coupling each rod to said frame to permit said lens to be positioned in front of said mirror at any one of a plurality of predetermined distances.

4. The makeup mirror assembly according to claim 1 wherein said reflecting surface is of the type providing magnification.

5. A makeup mirror apparatus adapted for use by an individual having a visual handicap, which handicap can be corrected by means of corrective lenses as spectacles, comprising:
    a. a planar mirror, having a front reflective surface, and side surfaces defining a boundary for said reflective surface,
    b. a frame coupled to said mirror for retaining the same about the periphery of said side surfaces,
    c. a bracket secured to said frame and adapted to position said mirror at a given distance above a horizontal reference plane,
    d. first and second corrective lenses, each having an optical prescription according to the needs of said user,
    e. adjustable means coupling both said first and second lenses to said frame in front of said reflecting surface, said means as adjusted, enabling a user to position either of said lenses at any one of a plurality of distances in front of said surface.

6. The apparatus according to claim 5 wherein said adjustable means include a first rod coupled to said first lens at one end and a second rod coupled to said second lens at one end, and first and second brackets, one coupled to a right side of said frame and the other to a left side of said frame, each having a rod accommodating aperture for receiving the other end of one of said rods, to permit said rod to slide within said aperture for adjusting said distance.

7. The apparatus according to claim 5 wherein said reflecting surface of said mirror is of the type providing magnification.

8. The apparatus according to claim 6 wherein said first and second rods as coupled to said first and second lenses, comprises coupling means including a hinge assembly to permit the pivoting of said lenses with respect to said rod.

9. The apparatus according to claim 5, wherein said first and second corrective lenses each include a frame for retaining the same, said frame being of the type generally employed in spectacles.

* * * * *

UNITED STATES PATENT OFFICE
CERTIFICATE OF CORRECTION

Patent No. 3,970,369            Dated July 20, 1976

Inventor(s) PHYLLIS WACHSMAN

It is certified that error appears in the above-identified patent and that said Letters Patent are hereby corrected as shown below:

Title Page, line 54 - after "MAKEUP" and before "EMPLOYING" please delete "AND" and insert ---AID---.

Column 1, line 1 - after "MAKEUP" and before "EMPLOYING" please delete "AND" and insert ---AID---.

Signed and Sealed this

Twenty-first Day of September 1976

[SEAL]

Attest:

RUTH C. MASON
*Attesting Officer*

C. MARSHALL DANN
*Commissioner of Patents and Trademarks*